(12) United States Patent
Ando et al.

(10) Patent No.: US 6,369,134 B2
(45) Date of Patent: Apr. 9, 2002

(54) CATIONIC ELECTRODEPOSITION COATING COMPOSITION CONTAINING PLASTICIZER

(75) Inventors: Makoto Ando, Osaka-fu; Masahiro Takegawa, Nara-ken; Shinsuke Shirakawa; Mitsuo Yamada, both of Osaka-fu, all of (JP)

(73) Assignee: Nippon Paint Co., Ltd., Osaka-Fu (JP)

( * ) Notice: Subject to any disclaimer, the term of this patent is extended or adjusted under 35 U.S.C. 154(b) by 0 days.

(21) Appl. No.: 09/754,069

(22) Filed: Jan. 5, 2001

(30) Foreign Application Priority Data

Jan. 7, 2000 (JP) ........................................ 2000-001434

(51) Int. Cl.$^7$ ............................................. C08L 63/00
(52) U.S. Cl. ...................... 523/415; 523/400; 523/402; 523/414
(58) Field of Search ................................ 523/400, 402, 523/414, 415

(56) References Cited

U.S. PATENT DOCUMENTS 5,936,012 A * 8/1999 Kaufman et al. ........... 523/404
5,977,247 A * 11/1999 Schafheutle et al. ........ 524/491
6,111,048 A * 8/2000 Asahina et al. ................ 528/45
6,214,470 B1 * 4/2001 Tazzia et al. ............. 428/425.8

* cited by examiner

Primary Examiner—Edward J. Cain
(74) Attorney, Agent, or Firm—Wenderoth, Lind & Ponack, L.L.P.

(57) ABSTRACT

A cationic electrodeposition coating composition which contains a plasticizer is provided, which does not cause poor adhesion with intermediate and top coats, and allows the VOC content to be reduced. The cationic electrodeposition coating composition of the present invention is a cationic electrodeposition coating composition which contains a cationic group-containing epoxy modified base resin, a blocked isocyanate curing agent and a plasticizer, wherein the plasticizer is a propylene oxide oligomer with an average molecular weight of 200 to 1500, contains a primary hydroxyl group on the repeating terminals of the propylene oxide, and contains one or two primary hydroxyl groups and/or primary amino groups in the molecule.

7 Claims, No Drawings

CATIONIC ELECTRODEPOSITION COATING COMPOSITION CONTAINING PLASTICIZER

BACKGROUND OF THE INVENTION

1. Field of the Invention

The present invention relates to a cationic electrodeposition coating composition which contains a plasticizer, and in particular to a cationic electrodeposition coating composition which contains a propylene oxide oligomer as a plasticizer.

2. Description of the Related Art

The level of awareness of environmental issues has increased of late, and along with it unprecedented efforts have been made to reduce the amount of organic solvents released into the atmosphere. Although cationic electrodeposition coatings contain water as a medium, and are thus aqueous in nature, they contain volatile organic compounds (VOCs) nonetheless.

Typical cationic electrodeposition coatings contain butyl cellosolve, hexyl cellosolve or another organic solvent as a plasticizer, to ensure a smooth coating film. However, as noted in the foregoing, the inclusion of these organic solvents is not preferable from an environmental standpoint. In an attempt to resolve such drawbacks, Japanese Patent Application Laid-open No. 1-69678 teaches that polypropylene glycol with a molecular weight of 1500 to 6000 can be added as a plasticizer. The polypropylene glycol which has been added migrates to the surface and be able to impart of smoothness therein. However, the propylene oxide repeating units therein contained have a low solubility parameter, and therefore if intermediate and top coats are formed on the resulting cationic electrodeposition coating film, poor adhesion results.

SUMMARY OF THE INVENTION

It is an object of the invention to provide a cationic electrodeposition coating composition which contains a plasticizer and a reduced VOC content, without having to sacrifice the good adhesion with intermediate and top coats.

The cationic electrodeposition coating composition of the present invention contains a cationic group-containing epoxy modified base resin, a blocked isocyanate curing agent and a plasticizer, wherein the plasticizer is a propylene oxide oligomer with an average molecular weight of 200 to 1500, contains a primary hydroxyl group on repeating terminals of the propylene oxide, and contains one or two primary hydroxyl groups and/or primary amino groups in the molecule.

The propylene oxide oligomer referred to in the foregoing can be represented by:

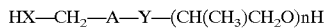

(where X is an oxygen atom or NH; A is a hydrocarbon group with 1 to 11 carbons which may be branched or which may have interposed oxygen atoms; Y is an oxygen atom, NH or N—A—CH$_2$—XH (with A and X being the same as described above) and n is 3 to 22). An amount of plasticizer contained in such a configuration can be 2 to 15 wt % per the total solid content weight of the cationic group-containing epoxy modified base resin and blocked isocyanate curing agent.

In addition, the present invention also provides an article which is coated by the electrodeposition coating composition as mentioned above.

DESCRIPTION OF THE PREFERRED EMBODIMENTS

The cationic electrodeposition coating composition of the present invention contains a cationic group-containing epoxy modified base resin, a blocked isocyanate curing agent and a plasticizer.

The plasticizer contained in the cationic electrodeposition coating composition of the present invention is a propylene oxide oligomer having an average molecular weight of 200 to 1500, which contains a primary hydroxyl group on the repeating terminals of the propylene oxide and which contains one or two primary hydroxyl groups and/or primary amino groups in the molecule. If the average molecular weight falls outside the aforedescribed range, smoothness is not imparted to the coating film. A preferable average molecular weight is 600 to 1000.

The propylene oxide oligomer can be represented by:

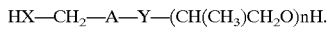

In the above expression, X is an oxygen atom or NH. Since X bonds with the hydrogen atom and the CH2, the aforedescribed plasticizer is to contain primary hydroxyl groups in the molecule when X is an oxygen atom and primary amino groups when X is NH.

A is a hydrocarbon group with 1 to 11 carbons which may be branched, or which may have interposed oxygen atoms. Y is an oxygen atom, NH or N—A—CH$_2$—XH (with A and X being the same as earlier described). As is described in the following, the plasticizer contained in the cationic electrodeposition coating composition of the present invention is obtained by addition reacting propylene oxide with a starting substance selected from among diols which contain a primary hydroxyl group, amino alcohols which contain primary hydroxyl groups and primary amino groups, diamines which contain primary amino groups and polyamines which contain primary amino groups and secondary amino groups, and therefore the A is a structure obtained by removing a single methylene group from a hydrocarbon moiety which may contain the oxygen atoms and which constitutes the starting material, and the Y is a structure obtained by removing an active hydrogen from the primary hydroxyl groups, primary amino groups or secondary amino groups, with which the addition reaction is initiated.

For example, with ethylene glycols, in which the starting substance is a diol which contains primary hydroxyl groups, X and Y are oxygen atoms and A is a methylene group. With ethanolamines, in which the starting substance is an amino alcohol which contains primary hydroxyl groups and primary amino groups, X is NH, A is a methylene group and Y is an oxygen atom. With ethylene diamines, in which the starting substance is a polyamine which contains primary amino groups and secondary amino groups, X is NH, A is a methylene group and Y is N—A—CH2—XH (with A and X being the same as earlier described).

The n in the expression represents the number of repeating units in the propylene oxide. The propylene oxide repetition enables the viscosity to be reduced and the smoothness of the cationic electrodeposition coating film to be improved. A number from 3 to 22 can be taken for n, depending on the average molecular weight range and the configuration of the aforedescribed HX—CH$_2$—A—Y. The plasticizer contained in the cationic electrodeposition coating composition of the present invention is a propylene oxide oligomer and therefore the value of the n does not necessarily have to be an integer.

The plasticizer contained in the cationic electrodeposition coating composition of the present invention contains a primary hydroxyl group on the repeating terminals of the propylene oxide. The primary hydroxyl group together with one or two primary hydroxyl groups and/or primary amino groups contained in the molecule contribute the curing reactivity in the cationic electrodeposition coating composition, and inhibit decrease of the corrosion resistance that is brought about by the addition of the plasticizer to be controlled.

The plasticizer can be obtained by conducting a ring-opening addition reaction in the presence of a catalyst between the propylene oxide and a starting substance comprising diols which contain primary hydroxyl groups, amino alcohols which contain primary hydroxyl groups and primary amino groups, diamines which contain primary amino groups and polyamines which contain primary amino groups and secondary amino groups. Examples of the primary hydroxyl group-containing diols include ethylene glycol, diethylene glycol, triethylene glycol, tetraethylene glycol, 1,3-propane diol, 1,4-butane diol, 1,5-pentane diol, 1,6-hexane diol, 1,8-nonane diol, 1,10 -decane diol and 1,12- dodecane diol.

Examples of the primary hydroxyl group- and primary amino group-containing amino alcohols include ethanol amine, hydroxyethylene hydrazine, 3-amino-1-propanol, 4-amino-1-butanol, 5-amino-1-pentanol, 6-amino-1-hexanol, 2-(2-aminoethoxy)ethanol, 3-amino-1,2-propane diol, serinol, 2-amino-2-ethyl-1,3-propane diol, 2-amino-2-ethyl-1,3-propane diol, and 1,3-diamino-2-hydroxy propane.

Examples of the primary amino group-containing diamine include ethylene diamine, diaminopropane, diamino butane, diamino pentane, hexane diamine, diaminopentane, diamino octane, diamino nonane, diamino decane and diamino dodecane. Examples of primary amino group- and secondary amino group-containing polyamines include N-ethyl ethylene diamine, N-propyl ethylene diamine, N-isopropyl ethylene diamine, N-methyl-1,3-propane diamine, N-propyl-1,3-propane diamine, N-isopropyl-1,3-propane diamine, diethylene triamine, N-(2-aminoethyl)-1,3-propane diamine, and 3,3'-iminobispropyl amine.

When the aforedescribed starting substance is an amino alcohol which contains primary hydroxyl groups and primary amino groups, a diamine which contains primary amino groups, or a polyamine which contains primary amino groups and secondary amino group, the primary amino groups can be protected by forming a ketimine group, and the primary amino group is regenerated by unblocking the ketimine group once the addition reaction has finished. In primary amino group-containing diamines, the intended reaction can be progressed by making one of the primary amino groups to ketimine.

Conditions such as type and amount of catalyst, reaction temperature etc. in the reaction dictates whether substances represented by HX—CH$_2$—A—Y—(CH$_2$(CH$_3$)CHO)nH (where X, A and Y are all as above described) which contain terminal secondary hydroxyl groups are included, in addition to substances which contain terminal primary hydroxyl group, can be used as the plasticizer contained in the cationic electrodeposition coating composition of the present invention, provided that the weight ratio of substances which contain terminal primary hydroxyl group I substances which contain terminal secondary hydroxyl groups is greater than 60/40.

A description of the cationic group-containing epoxy modified base resin which is contained in the cationic electrodeposition coating composition of the present invention shall now follow. The cationic group-containing epoxy modified base resin is manufactured by opening the epoxy rings in the starting material epoxy resin by bringing about a reaction with a mixture of a primary amine, secondary amine, tertiary amine acid salt or other amine, a sulphide and an acid. The term "cationic group" as appears in the present specification shall refer to a group which is cationic in itself or a group rendered cationic by the addition of an acid. A typical example of the starting raw material resin is a polyphenol polyglycidyl ether epoxy resin formed from a reaction between bisphenol A, bisphenol F, bisphenol S, phenol novolak, cresol novolak or other polycyclic phenol compound and epichlorohydrin. A further example of the starting raw material resin is an oxazolidone ring-containing epoxy resin as taught in Japanese Patent Application Laid-open No. 5-306327. This epoxy resin is obtained through a reaction between a diisocyanate compound or a bisurethane compound obtained by blocking the NCO groups in a diisocyanate compound with methanol, ethanol or other lower alcohol, and epichlorohydrin.

The epoxy resin which is the starting raw material can be used by chain-extending with a bifunctional polyester polyol, polyether polyol, bisphenol or dibasic carboxylic acid for chain extension, prior to the epoxy ring-opening reaction brought about by the amine or sulfide. Similarly, in order to adjust the molecular weight or amine equivalent, or to improve the heat flow property, some of epoxy rings of the epoxy resin may be reacted with 2-ethyl hexanol, nonyl phenol, ethylene glycol mono-2-ethyl hexyl ether, propylene glycol mono-2-ethyl hexyl ether or other monohydroxy compound, prior to the epoxy ring-opening reaction.

Examples of amines which can be used when opening the epoxy rings and introducing the amino groups include butylamine, octylamine, diethylamine, dibutylamine, methylbutylamine, monoethanolamine, diethanolamine, N-methylethanolamine, triethylamine acid salt, and N,N-dimethylethanolamine acid salt or other primary, secondary or tertiary amine acid salt. A ketimine blocked secondary amine having an primary amino group, such as aminoethylethanolamine methylisobutyl ketimine may also be used. It is necessary for at least an equivalent amount of these amines to be reacted with the epoxy rings in order to open all of the epoxy rings.

Examples of sulfides include diethyl sulfide, dipropyl sulfide, dibutyl sulfide, dihexyl sulfide, diphenyl sulfide, ethyl phenyl sulfide, tetramethylene sulfide, pentamethylene sulfide, thiodiethanol, thiodipropanol, thiodibutanol, 1-(2-hydroxyethylthio)-2-propanol, 1-(2-hydroxyethylthio)-2-butanol, and 1-(2-hydroxyethylthio)-3-butoxy-1-propanol. Examples of acids include formic acid, acetic acid, lactic acid, propionic acid, boric acid, butyric acid, dimethylolpropionic acid, hydrochloric acid, sulfuric acid, phosphoric acid, N-acetylglycine, N-acetyl-β-alanine and sulphamic acid.

It is preferable for the number average molecular weight of the aforedescribed cationic group-containing epoxy modified base resin to be in the range of 600 to 4,000. A number average molecular weight of less than 600 will cause the solvent resistance, corrosion resistance and other properties in the resulting coating film to decrease. Conversely, a number average molecular weight in excess of 4,000 will complicate not only the synthesis process because of difficulty in controlling resin solution viscosity, but also the handling of the resulting resin during such procedures as emulsification dispersion. Moreover, the high viscosity will adversely affect the flow property during heating and curing, which will lead to a markedly worse external appearance of the coating film. It is preferable for the amino value or sulphonium value of the aforedescribed cationic group-containing epoxy modified base resin to be 30 to 150, and even more preferably 45 to 120. Should the amino or sulphonium value fall below 30, it will become more difficult for a stable emulsion to be obtained, while if the values should exceed 150, drawbacks arise with Coulomb efficiency, redissolution and other electrodeposition coating-related operational considerations.

A description of the blocked isocyanate curing agent contained in the cationic electrodeposition coating composition of the present invention shall now follow. The aforedescribed blocked isocyanate curing agent can be obtained by bringing about a reaction between a polyisocyanate compound which contains two or more isocyanate groups and a blocking agent which is added to the isocyanate groups and which is stable at ambient temperatures, but can regenerate free isocyanate groups when heated to above the dissociation temperature. These blocked isocyanate which are employed in cationic electrodeposition coatings can also be used.

Examples of the aforedescribed polyisocyanate compound include trimethylene diisocyanate, trimethyl hexamethylene diisocyanate, tetramethylene diisocyanate, hexamethylene diisocyanate and other alkylene diisocyanate, bis(isocyanatemethyl)cyclohexane, cyclopentane diisocyanate, cyclohexane diisocyanate, isophorone diisocyanate and other cycloalkylene-based diisocyanates, tolylene diisocyanate, phenylene diisocyanate, diphenylmethane diisocyanate, diphenylether diisocyanate and other aromatic diisocyanates, xylylene diisocyanate, diisocyanate diethylbenzene and other aromatic/aliphatic diisocyanates, triphenylmethane triisocyanate, triisocyanate benzene, triisocyanate toluene and other triisocyanates, diphenyl dimethyl methane tetraisocyanate and other tetraisocyanates, tolylene diisocyanate dimers or trimers and other polymerisable polyisocyanates, and terminal isocyanate-containing compounds which are obtained by bringing about a reaction between the various aforedescribed polyisocyanate compounds and a low molecular active hydrogen-containing organic compound such as ethylene glycol, propylene glycol, diethylene glycol, trimethylol propane, hydrogenated bisphenol A, hexanetriol, glycerine, pentaerythritol, castor oil and triethanolamine.

Examples of the aforedescribed blocking agents include phenol, cresol, xylenol, chlorophenol, ethyl phenol and other phenol-based blocking agents; ε-caprolactam, δ-valerolactam, γ-butyrolactam, β-propiolactam and other lactam-based blocking agents; ethyl acetoacetate, acetyl acetone and other active methylene-based blocking agents; methanol, ethanol, propanol, butanol, amyl alcohol, ethylene glycol monomethyl ether, ethylene glycol monoethyl ether, ethylene glycol monomethyl ether [sic], propylene glycol monomethyl ether, benzyl alcohol, methyl glycolate, butyl glycolate, diacetone alcohol, methyl lactate, ethyl lactate and other alcohol-based blocking agents; formaldoxime, acetoaldoxime, acetoxime, methyl ethyl ketoxime, diacetyl monooxime, cyclohexaneoxime and other oxime-based blocking agents; butyl mercaptan, hexyl mercaptan, t-butyl mercaptan, thiophenol, methyl thiophenol, ethyl thiophenol and other mercapto-based blocking agents; acetic acid amide, benzamide and other acid amide-based blocking agents; succinic acid imide, maleic acid imide and other imide-based blocking agents; and imidazole, 2-ethyl imidazole and other imidazole-based blocking agents. It is preferable for at least one blocking agent selected from among the phenol-based, lactam-based and oxime-based blocking agents to be used when low temperature curing ability is required.

It is preferable for the amount of the aforedescribed components to be contained in the cationic electrodeposition coating composition of the present invention to be 2 to 15 wt % per the total solid content weight of the cationic group-containing epoxy modified base resin and blocked isocyanate curing agent, with 3 to 10 wt % being more preferable. The desired effect will not be obtainable at less than 2 wt %, while the corrosion resistance of the coating film will be adversely affected at more than 15 wt %. It is preferable for the solid content weight ratio between the cationic group-containing epoxy modified base resin and the blocked isocyanate curing agent to be 50/50 to 90/10, and even more preferably 60/40 to 80/20. If the ratio falls outside these ranges, curing ability may be adversely affected.

The cationic electrodeposition coating composition of the present invention further contains an acid for neutralization in order to disperse water through the aforedescribed components. Examples of the acids for neutralization include the same ones used in combination with the sulfides as described in the foregoing. The amount of acid shall vary with the amino group or sulphonium group content in the aforedescribed cationic electrodeposition coating composition, as well as with the primary amino group content if the plasticizer contains primary amino groups; however, it is preferable for the amount thereof to be sufficient to allow water dispersion.

The cationic electrodeposition coating composition of the present invention may additionally contain a pigment and a pigment dispersing resin. There is no particular limitation on the pigment provided it is a known pigment; examples of same include titanium dioxide, carbon black, red iron oxide and other color pigments; kaolin, talc, aluminum silicate, calcium carbonate, mica, clay, silica and other extender pigments; zinc phosphate, iron phosphate, aluminum phosphate, calcium phosphate, zinc phosphite, zinc cyanide, zinc oxide, aluminum tripolyphosphate, zinc molybdate, aluminum molybdate, calcium molybdate, aluminum phosphomolybdate and other rust-preventing pigments. A cationic or non-ionic low molecular weight surfactant and modified epoxy resins which contain quaternary ammonium groups and/or tertiary sulphonium groups can be used as the pigment dispersing resin.

The pigment dispersing resin and pigment are mixed in a prescribed amount by using a ball mill, sand grinding mill or other known dispersing device until predetermined particle sizes have attained uniformly to obtain a paste in which the pigment has been dispersed. The pigment-dispersed paste can be used as long as the pigment in the cationic electrodeposition coating composition constitutes 0–50 wt % of the solid content.

The cationic electrodeposition coating composition of the present invention may further contain surfactants, antioxidants, UV absorbing agents, curing accelerators and other commonly used coating additives.

The cationic electrodeposition coating composition of the present invention can be obtained by admixing the cationic group-containing epoxy modified base resin, blocked isocyanate curing agent and plasticizer, and, if necessary, a pigment-dispersed paste and a coating additive. In other words, when the cationic group-containing epoxy modified base resin is an amino group, the starting raw material epoxy resin and blocked isocyanate curing agent are mixed together and an acid for neutralization is added thereto. The cationic electrodeposition coating composition of the present invention can be obtained by adding the plasticizer thereinto, dispersing the mixture with water or an aqueous medium comprising a mixture of water and a hydrophilic organic solvent, and then as needed admixing the pigment-dispersed paste. The additives can be added into the system at the desired stages.

The article which is to be electro-coated according to the present invention can be a substrate which has been used for electro-coating in this field. The substrate can be a substrate capable of electrically coating. The cationic electrodeposition coating can be performed according to a known method; typically deionized water is used to dilute the solid content concentration to 5 to 40 wt % and preferably to 15 to 25 wt %, an electrodeposition bath comprising the cationic electrodeposition coating composition adjusted to a pH range of 5.5 to 8.5 is adjusted to a temperature of 20 to 35° C. and the electrodeposition process is carried out under a load voltage of 100 to 450 V.

It is suitable for a thickness of the film produced by electrodeposition coating to be 5 to 40 $\mu$m when dried, and preferably 10 to 30 $\mu$m. It is preferable to set the conditions for the electrodeposition coating such that this thickness is achieved. It is appropriate for the coating film to be baked at 100 to 220° C., and preferably at 140 to 200° C. for 10 to 30 minutes.

It is possible to form a further intermediate or top coat on the article which is to be coated by means of electrodeposition of the present invention. Coatings and coating conditions which are applicable for use in coating external panels for e.g. cars may be used in the formation of the afore-described intermediate and top coats.

EXAMPLES

"Parts of" as referred to in the following shall denote "weight parts of".

Manufacturing Example 1
Manufacturing the Cationic Group-Containing Epoxy Modified Base Resin 92 Parts of 2,4-/2,6-tolylene diisocyanate (weight ratio= 8/2), 95 parts of methyl isobutyl ketone ("MIBK" below) and 0.5 parts of dibutyltin dilaurate were introduced into a flask fitted with a stirrer, cooling tube, nitrogen introduction tube, thermometer and dropping funnel. Then, 21 parts of methanol was added dropwise into the reaction mixture under stirring. The reaction temperature began at room temperature and then increased to 60° C. by the generation of heat. The reaction was then continued for 30 minutes, subsequent to which 57 parts of ethylene glycol mono-2-ethyl hexyl ether was added dropwise thereinto via a dropping funnel. Further, 42 parts of 5-mol bisphenol A-propylene oxide adduct was added to the reaction mixture. The reaction was primarily conducted at 60 to 65° C. and was interrupted until IR spectrographic assessment revealed that absorption due to the isocyanate groups had disappeared.

Next, 365 parts of epoxy resin with an epoxy equivalent of 188, which had been synthesized from bisphenol A and epichlorohydrin using a known method, was added in to the reaction mixture, and the temperature was raised to 125° C. Then 1.0 part of benzyl dimethyl amine was added thereto and the reaction carried out at 130° C. until an epoxy equivalent of 410 parts of had been attained.

Next, 87 parts of bisphenol A was added and the reaction carried out at 120° C., whereupon an epoxy equivalent of 1190 had been attained. The reaction mixture was then cooled, after which 11 parts of diethanolamine, 24 parts of N-ethylethanolamine and 25 parts of ketimined aminoethylethanolamine (79 wt % MIBK solution ) were added thereto and the reaction carried out at 110° C. for two hours. Diluting the mixture with MIBK to bring the non-volatile content to 80% resulted in a cationic group-containing epoxy modified base resin with a glass transition point of 22° C. (80% solid resin content).

Manufacturing Example 2
Manufacturing the Blocked Isocyanate Curing Agent

1250 Parts of diphenyl methane diisocyanate and 266.4 parts of MIBK were introduced into a reaction vessel, which was heated to 80° C., after which 2.5 parts of dibutyltin dilaurate was added thereto. A solution comprising 226 parts of $\epsilon$-caprolactam dissolved in 944 parts of butyl cellosolve was then added dropwise thereinto at 80° C. for 2 hours. After heating the mixture for a further 4 hours at 100° C., IR spectrographic assessment was used to confirm that absorption due to the isocyanate groups had disappeared. The mixture was allowed to cool, after which 336.1 parts of MIBK was added thereinto to yield a blocked isocyanate curing agent.

Manufacturing Example 3
Manufacturing the Pigment Dispersing Resin 222.0 Parts of isophorone diisocyanate ("IPDI" below) was introduced into a flask fitted with a stirrer, cooling tube, nitrogen introduction tube, thermometer and dropping funnel and diluted with 39.1 parts of MIBK, after which 0.2 parts of dibutyltin dilaurate was added thereto. The temperature of the mixture was raised to 50° C., after which 131.5 parts of 2-ethyl hexanol was added dropwise over two hours in a dry nitrogen atmosphere under stirring. By cooling the mixture appropriately, the reaction temperature was maintained at 50° C. 2-ethyl hexanol half-blocked IPDI was thereby obtained (90.0% solid resin content).

Next, 87.2 parts of dimethyl ethanol amine, 117.6 parts of 75% aqueous lactic acid solution and 39.2 parts of ethylene glycol mono butyl ether were successively added into a suitable reaction vessel and stirred together for approximately 30 minutes at 65° C. to yield a quaternising agent.

Next, 710.0 parts of Epon 829 (bisphenol A-type epoxy resin; epoxy equivalent: 193 to 203; Shell Chemical Company) and 289.6 bisphenol A were introduced into a suitable reaction vessel and heated in a nitrogen atmosphere at 150 to 160° C. to cause an initial exothermic reaction. The reaction was carried out in the reaction mixture for approximately one hour at 150 to 160° C., after which the reaction mixture was cooled to 120° C. and 498.8 parts of the 2-ethyl hexanol half-blocked IPDI (MIBK solution) prepared beforehand was added thereinto.

The reaction mixture was maintained at 110 to 120° C. for approximately 1 hour, after which 1390.2 parts of ethylene glycol mono butyl ether was added thereinto; the mixture was then cooled to 85 to 95° C. and once it had achieved a uniform state, 196.7 parts of the quaternising agent prepared beforehand was added thereinto. The reaction mixture was kept at 85 to 95° C. until the acid value had reached 1, and then 37.0 parts of deionized water was added thereinto, and once the quaternisation in the epoxy-bisphenol A resin had been stopped, a pigment dispersing resin which contained a quaternary ammonium salt moiety was obtained (50% solid resin content)

Manufacturing Example 4
Manufacturing the Pigment-Dispersed Paste

120 Parts of pigment dispersing resin obtained in Manufacturing Example 3, 2.0 parts of carbon black, 100.0 parts of kaolin, 80.0 parts of titanium dioxide, 18.0 parts of aluminum phosphomolybdate and ion-exchange water were introduced into a sand grinding mill and allowed to disperse therein until the particle sizes were no greater than 10 μm. A pigment-dispersed paste was thereby obtained (48% solid content).

Example 1
Manufacturing the Cationic Electrodeposition Coating Composition

The cationic group-containing epoxy modified base resin obtained in Manufacturing Example 1 and the blocked isocyanate curing agent obtained in Manufacturing Example 2 were mixed together until uniform, with a solid content ratio of 70/30. Next, PX-800 (Sanyo Kasei; molecular weight: 800) with a $HOCH_2CH_2O(CH(CH_3)CH_2O)_{12.7}H$ structure was added as a plasticizer until 5 wt % of it was present with respect to the solid content. Glacial acetic acid was added thereinto until 45% neutralization had been attained, and the mixture was further diluted by the gradual addition of ion-exchange water. An emulsion with a solid content of 36% was obtained by removing the MIBK under reduced pressure.

1697 Parts of emulsion, 393.9 parts of pigment-dispersed paste as obtained in Manufacturing Example 4, 1899.3 parts of ion-exchange water, and 9.8 parts of dibutyltin oxide were mixed together, resulting in a cationic electrodeposition coating composition with a 20 wt % solid content. The ratio of pigment to solid resin content in the cationic electrodeposition coating composition was 1/4.5.

Comparative Example 1

A cationic electrodeposition coating composition was obtained in the same manner as in Example 1, with the exception that BP-5P (Sanyo Kasei), which is a 5 mol propylene glycol adduct of bisphenol A with a molecular weight of approximately 500, was used as the plasticizer instead of the PX-800, until 5 wt % of same was present with respect to the solid content.

Comparative Example 2

A cationic electrodeposition coating composition was obtained in the same manner as in Example 1, with the exception that PX-800 was not used as the plasticizer.

The cationic electrodeposition coating compositions obtained in the aforedescribed Example 1 and Comparative Examples 1 and 2 were assessed against the below categories. The results of the assessment are displayed in Table 1.

(VOC Value)

The cationic electrodeposition coating compositions were electrodeposited on zinc phosphate-treated plates made from cold rolled steel, with a solution temperature of 30° C. and a coating voltage of 190 to 200 V. The thickness of the dried film obtained by baking the plates for 25 minutes at 170° C. was brought to 20 μm by adding butyl cellosolve. The VOC value (unit: g/L) was determined from the following expression, using the amount of volatile solvent in the coating during that time:

$$VOC\ value = \frac{total\ mass\ of\ solvent\ in\ the\ coating\ composition}{volume\ of\ non\text{-}volatile\ content\ in\ the\ coating\ composition}$$

(Corrosion Resistance during Immersion in Salt Water)

The 20 μm-thick dried coating films which had been obtained for the assessment of the VOC value were immersed for 240 hours at 55° C. in 5% salt water and a portion of each was cut and peeled off as a tape. The peeling widths of both sides of the cut portions were assessed against the following criteria:

O: <3 mm
Δ: 3 to 6 mm
"X" mark: >6 mm (Adhesion of Intermediate Coat)

An intermediate powdered coating was applied onto the 20 μm-thick dried coating films which had been obtained for the assessment of the VOC value to attain a dry film thickness of 75 μm and then these were baked for 20 minutes at 190° C. The assembly was cooled and then cut with a knife into a grid with 100 (2 mm×2 mm) squares. A adhesive tape was affixed to the surface of same and abruptly peeled off; the number of squares remaining on the coating film were then counted (primary adhesion). Next, another area of the coating film was cut into 100 (2 mm×2 mm) squares using a knife and this was left to stand for 240 hours at 50° C. In the same manner as described in the foregoing, a pressure-sensitive adhesive tape was affixed to the squares and abruptly peeled off. The number of squares remaining on the coating film was then counted (secondary adhesion).

TABLE 1

| | | Example 1 | Comparative Example 1 | Comparative Example 2 |
|---|---|---|---|---|
| Plasticizer | | PX-800 | BP-5P | None |
| Amount of butyl cellosolve added*1 (wt %) | | 0.2 | 0.2 | 0.4 |
| VOC value (g/L) | | 72 | 72 | 104 |
| Corrosion resistance during immersion in salt water | | O | Δ | O |
| Adhesion of intermediate coat | Primary adhesion | 100/100 | 80/100 | 100/100 |
| | Secondary adhesion | 100/100 | 80/100 | 100/100 |

The above results show that with the cationic electrodeposition coating composition of the present invention, the VOC value can be made demonstrably less than in compositions which do not contain a plasticizer, and moreover the decreases in corrosion-proofing and problems related to poor adhesion which are seen when conventional plasticizers are used are not exhibited.

The plasticizer contained in the cationic electrodeposition coating composition of the present invention contains propylene oxide repetitions, and these repetitions lower the viscosity of the coating film surface; it is assumed therefore, that as a result of this the resulting coating film has exceptional smoothness. Furthermore, the terminals of the aforedescribed plasticizer are constituted by primary hydroxyl groups or primary amino groups which have a high curing reactivity and therefore the plasticizer is a component which not only contributes adhesion to the cationic electrodeposition coating film, but has a role in its curing as well. Accordingly, poor adhesion does not occur with intermediate and top coats, and no diminishing of the corrosion resistance is seen.

By virtue of its containing the aforedescribed plasticizer, the cationic electrodeposition coating composition of the present invention allows a lower amount of volatile organic compounds (VOCs) to be contained therein.

What is claimed is:

1. A cationic electrodeposition coating composition comprising a cationic group-containing epoxy modified base resin, a blocked isocyanate curing agent and a plasticizer, wherein said plasticizer is a propylene oxide oligomer with an average molecular weight of 200 to 1500, contains a primary hydroxyl group on repeating terminals of the propylene oxide, and contains one or two primary hydroxyl groups and/or primary amino groups in the molecule.

2. The cationic electrodeposition coating composition according to claim 1, in which said propylene oxide oligomer is expressed by

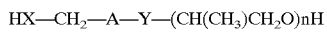
HX—CH$_2$—A—Y—(CH(CH$_3$)CH$_2$O)nH (where X is an oxygen atom or NH; A is a hydrocarbon group with 1 to 11 carbons which may be branched or which may have interposed oxygen atoms; Y is an oxygen atom, NH or N—A—CH$_2$—XH (with A and X being the same as described above) and n is 3 to 22).

3. The cationic electrodeposition coating composition according to claim 1, in which said plasticizer is contained in an amount of 2 to 15 wt % based on a total solid content weight of the cationic group-containing epoxy modified base resin and the blocked isocyanate curing agent.

4. An article which is to be electrocoated by using the cationic electrodeposition coating composition according to claim 1.

5. The cationic electrodeposition coating composition according to claim 2, in which said plasticizer is contained in an amount of 2 to 15 wt % based on a total solid content weight of the cationic group-containing epoxy modified base resin and the blocked isocyanate curing agent.

6. An article which is to be electrocoated by using the cationic electrodeposition coating composition according to claim 2.

7. An article which is to be electrocoated by using the cationic electrodeposition coating composition according to claim 3.

* * * * *